(12) United States Patent
Fujii et al.

(10) Patent No.: US 7,443,562 B2
(45) Date of Patent: Oct. 28, 2008

(54) DISPLAY DEVICE

(75) Inventors: Takamichi Fujii, Kanagawa-ken (JP);
Shinichiro Sonoda, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 244 days.

(21) Appl. No.: 11/004,944

(22) Filed: Dec. 7, 2004

(65) Prior Publication Data

US 2005/0128372 A1 Jun. 16, 2005

(30) Foreign Application Priority Data

Dec. 10, 2003 (JP) ............................. 2003-411890

(51) Int. Cl.
*G02F 1/07* (2006.01)
*G02F 1/133* (2006.01)

(52) U.S. Cl. ........................................ 359/245; 349/33

(58) Field of Classification Search .................. 349/33; 359/245, 253–254, 265, 290–291, 296
See application file for complete search history.

(56) References Cited

U.S. PATENT DOCUMENTS 4,419,663 A * 12/1983 Kohashi .................... 345/107

2004/0094422 A1 * 5/2004 Pullen et al. ................ 204/600

FOREIGN PATENT DOCUMENTS

| JP | 55-70820 A | | 5/1980 |
|---|---|---|---|
| JP | 55069126 A | * | 5/1980 |
| JP | 55070820 A | * | 5/1980 |
| JP | 60006928 A | * | 1/1985 |

OTHER PUBLICATIONS

Tadao Kohashi and Toshiharu Kurosawa, "Electroosmotic Display Device", IEEE Transactions On Electron Devices, vol. 38, No. 9, Sep. 1991, 2064-2069.*

* cited by examiner

*Primary Examiner*—Scott J. Sugarman
*Assistant Examiner*—Dawayne A Pinkney
(74) *Attorney, Agent, or Firm*—Sughrue Mion, PLLC

(57) ABSTRACT

A display device includes a porous body impregnated with electroendosmosis liquid, a transparent plate which is opposed to the porous body with a space intervening therebetween and is provided on its side facing the porous body with a light diffusive reflection surface and on the other side opposite to the one side with a light transmission surface, and an electric field forming system which forms an electric field acting on the electroendosmosis liquid and controls whether the electroendosmosis liquid is brought into contact with the light diffusive reflection surface by changing the electric field to selectively move the electroendosmosis liquid toward the porous body or the space.

21 Claims, 2 Drawing Sheets

DISPLAY DEVICE

BACKGROUND OF THE INVENTION

1. Field of the Invention

This invention relates to a display device, and more particularly to a display device for displaying an image formed by moving liquid impregnated in a porous body by the action of an electric field.

2. Description of the Related Art

There has been known a display device for displaying an image formed by moving liquid impregnated in a porous body by the action of an electric field. For example, there has been known a display device in which an electric voltage is imparted to a porous body impregnated with light transmission liquid material to control the light transmission liquid material pick-up of the porous body surface by the movement of the light transmission liquid material according to the electric voltage, thereby controlling the refractive index of the porous body surface. See, for example, Japanese Unexamined Patent Publication No. 55(1980)-70820. In this display device, when the porous body surface is fully impregnated with light transmission liquid material, the refractive indexes of the porous body and the light transmission liquid material are substantially equal to each other, whereby the external light is not reflected by the interface therebetween but is transmitted through the interface, whereas when the light transmission liquid material pick-up of the porous body surface is reduced, vacant porosities are generated in the porous body surface, whereby non-uniformity in refractive index is caused between the air in the porosities and the material of the porous body and the external light is reflected by the interface therebetween.

However, in such a display device where the reflectance of the surface of a porous body is controlled by moving light transmission liquid material impregnated in the porous body to change the light transmission liquid material pick-up of the porous body surface, there has been a problem that, since the range of movement of the liquid is limited, the liquid pick-up of the porous body surface does not sufficiently change, whereby high contrast cannot be obtained in display.

SUMMARY OF THE INVENTION

In view of the foregoing observations and description, the primary object of the present invention is to provide a display device which is for displaying an image formed by moving liquid impregnated in a porous body by the action of an electric field and which can display the image at high contrast.

The display device of the present invention comprises a porous body impregnated with electroendosmosis liquid, a transparent plate which is opposed to the porous body with a space intervening therebetween and is provided on its side facing the porous body with a light diffusive reflection surface and on the other side opposite to the one side with a light transmission surface, and an electric field forming means which forms an electric field acting on the electroendosmosis liquid and controls whether the electroendosmosis liquid is brought into contact with the light diffusive reflection surface by changing the electric field to selectively move the electroendosmosis liquid toward the porous body or the space.

The display device of the present invention displays on the basis of the fact that the reflectance of the light diffusive reflection surface of the transparent plate differs between the area where liquid is in contact with the surface and the area where liquid is not in contact with the surface (generally the area where liquid is in contact with the surface is lower in reflectance than the area where liquid is not in contact with the surface) and expresses whether the liquid is in contact with the light diffusive reflection surface or not in contact with the same as the difference of brightness on the transparent plate when the transparent plate is viewed with light projected onto the transparent plate.

The "space" either may be a vacuum or may be filled with gas which is substantially 1 in refractive index of light, such as air, nitrogen gas, hydrogen gas, helium gas, carbon dioxide gas, xenon gas, argon gas or the like and may be a space where a pressure which limits the movement of the electroendosmosis liquid does not exist.

The "light diffusive reflection surface" is a surface which is rough to such an extent that when the space is a vacuum or is filled with the gas such as air, light is diffused and when the space is filled with the electroendosmosis liquid, light is transmitted therethrough. The light diffusive reflection surface is, preferably, not smaller than 0.1 µm and not larger than 500 µm in mean surface roughness, more preferably, not smaller than 0.1 µm and not larger than 100 µm in mean surface roughness, and most preferably not smaller than 0.1 µm and not larger than 50 µm in mean surface roughness.

The "mean surface roughness" is an arithmetic mean roughness Ra according to JIS roughness/shape parameters (JIS B0601-1994) and is expressed as a value (in units of µm) obtained according to the following formula when a reference length l is taken out from a roughness curve in the direction of its mean line, X-axis is taken in the direction of the mean line of the taken part while Y-axis is taken in the direction of the longitudinal magnification of the taken part and when the roughness curve is expressed in the form of y=f(x).

$$Ra = (1/l)\int_{x=0}^{l} |f(x)| dx \tag{1}$$

It is preferred that the "transparent plate" be larger than 1.1 in refractive index of light.

The transparent plate provided with the light diffusive reflection surface may be, for instance, a ground glass, i.e., a glass or polymer substrate which has been applied with unevenness processing such as polishing on one side thereof. It is preferred that the height of the unevenness be not lower than 0.1 µm and not higher than 100 µm.

The "porous body" is a body having, at least in the surface opposed to the "space", pores through which the electroendosmosis liquid can move. The pore diameter of the porous body is preferably not smaller than 0.1 µm and not larger than 10 µm, and more preferably not smaller than 0.1 µm and not larger than 5 µm. The "pore diameter" as used here means the pore diameter defined by the bubble point method of the JIS standard (ASTMF316-86, JIS K3832) and refers a maximum pore diameter of an imagined capillary-like pore model where the pores of the porous body of a multiple layer structure overlap and communicate with each other only in the direction of thickness.

It is preferred that the porous body be, for instance, micro porous membrane filter of plastic material. As the plastic material, cellulose series plastic material for instance, nitrocellulose, acetylcellulose, and cellulose acetate can be employed. Further, the porous body can be formed of resins or ceramics such as vinyl chloride, polypropylene, polyamide, polytetrafluoroethylene, polyolefin, polysulfone, glass fibers and alumina, or combinations of these materials.

In the "electroendosmosis liquid", electroendosmosis liquid composition including therein homologs or isomers of paraffin halide disclosed, for instance, in Japanese Unexamined Patent Publication No. 60(1985)-6928 or electroendosmosis liquid composition which comprises charge controller and solvent as disclosed in Japanese Unexamined Patent Publication No. 5 (1993)-246021 and in which the charge controller is of alkylbenzenesulfonic acid or salts thereof can be employed as the refractive index matching liquid.

As the "electric field forming means", for instance, a means which applies a voltage between the opposite sides of the porous body by connecting a DC power source to electrodes which are respectively provided on one side of the porous body facing the "space" and the other side of the porous body opposite to the one side may be employed.

As the "electrode", a transparent electrode such as of ITO, $In_2O_3$, $SnO_2$, or ZnO or a colored electrode such as of Ni, Al, Pt, Ag or graphite can be employed. However, when the electrode is provided on each of the opposite sides of the porous body as in the example described above, it is necessary for the electrode disposed on the space side to have a physical property or a structure permeable to the electroendosmosis liquid and to be transparent.

Further, when the "electric field forming means" is a means which applies a voltage between opposite sides of the porous body by providing electrodes on opposite sides of the porous body as describe above, it is possible to form a plurality of combinations of electrodes on opposite sides of the porous body and control application of voltage to the combinations to correspond to the pixels upon display. In this case, on and off the voltage to the combinations either may be effected in the passive drive or in the active drive using thin film transistors (TFT).

Further, the electrodes forming the "electric field forming means" need not be provided on opposite sides of the porous body but may be, for instance, provided to sandwich therebetween the transparent plate and the porous body from outside. Further, the transparent plate may double as one of the electrodes with the other electrode provided on the side of the porous body opposite to the space.

It is preferred that the light diffusive reflection surface of the transparent plate be water- or oil-repellency-processed.

In the display device of the present invention, the electroendosmosis liquid may be colored. For example, the transparent electroendosmosis liquid may be colored by mixing therein pigment or dye.

Further, the distance between the transparent plate and the porous body may be held by the use of, for instance, a spacer.

In the display device of the present invention, the electroendosmosis liquid impregnated in the porous body is moved by the electric field to be in contact with the light diffusive reflection surface of the transparent plate opposed to the porous body with a space intervening therebetween, thereby changing the reflectance of the light diffusive reflection surface. Accordingly, change of the reflectance in the porous body surface can be larger as compared with in the conventional porous body and the contrast of the display can be higher as compared in the display device of this type.

When the light diffusive reflection surface of the transparent plate is water-repellency-processed or oil-repellency-processed, the electroendosmosis liquid is prevented from adhering to the light diffusive reflection surface upon white display where the electroendosmosis liquid is not to be in contact with the light diffusive reflection surface, thereby suppressing the wrong display.

Further, when the electroendosmosis liquid is colored, the contrast between so-called white display and so-called non-white display is increased, and the difference therebetween can be more distinctly viewed. Further, by selecting the color of the electroendosmosis liquid, the display-can be effected in a desired color.

DESCRIPTION OF THE PREFERRED EMBODIMENT

Figure 1:
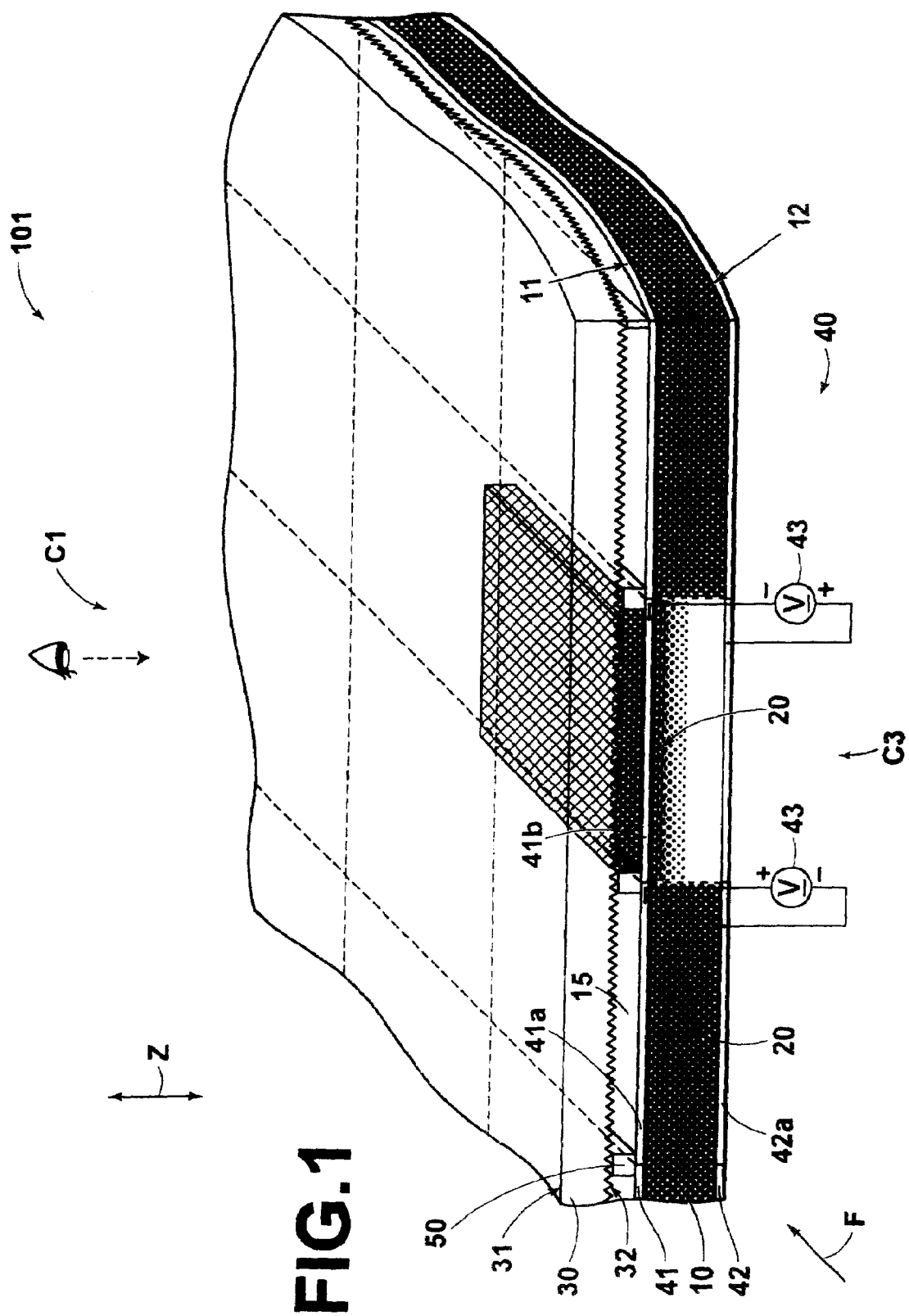
FIG. 1 is a perspective view schematically showing an arrangement of a display device in accordance with an embodiment of the present invention.
Figure 2:
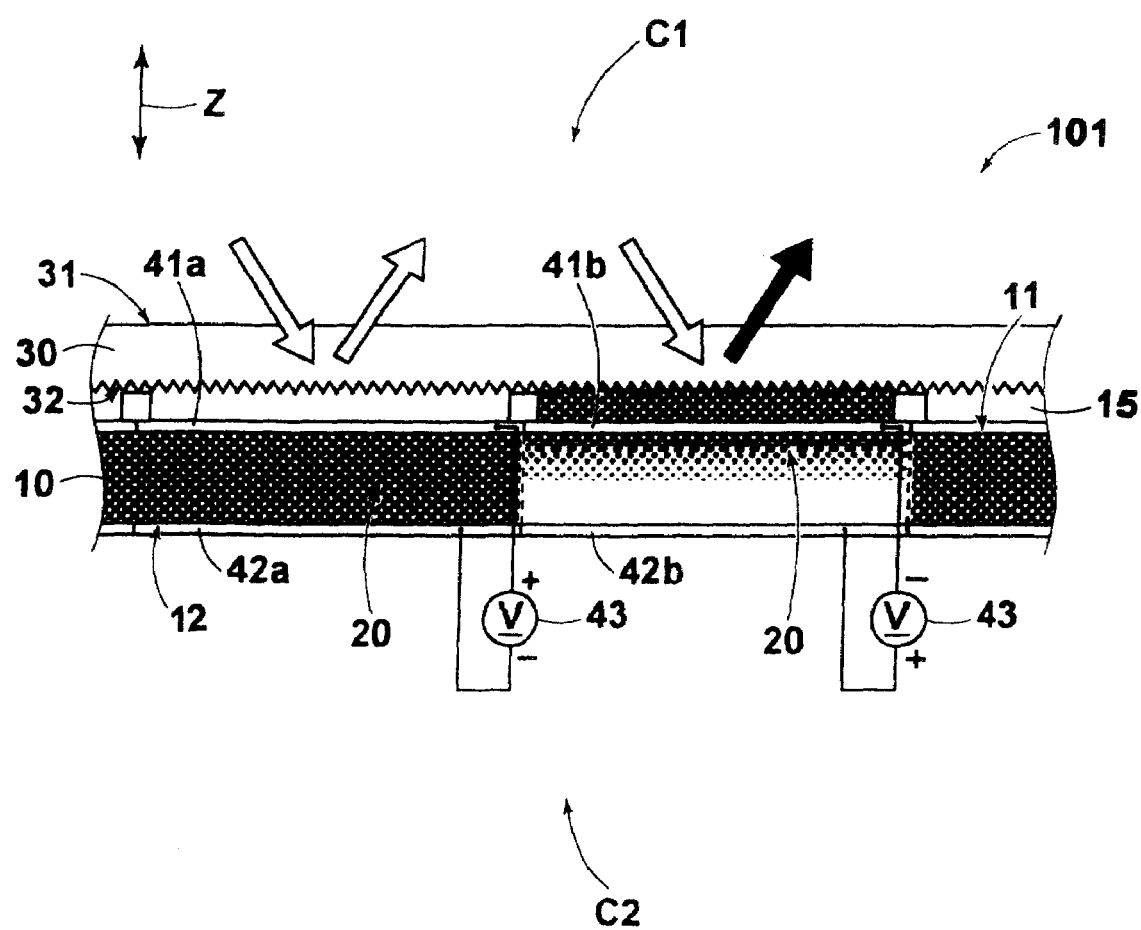
FIG. 2 is a fragmentary side view schematically showing an arrangement of the display device.

FIG. 1 is a perspective view schematically showing an arrangement of a display device in accordance with an embodiment of the present invention, and FIG. 2 is a fragmentary side view of the same (as seen in the direction of arrow F in FIG. 1).

The display device 101 in accordance with an embodiment of the present invention shown in FIG. 1 comprises a porous body 10 impregnated with electroendosmosis liquid 20, a transparent plate 30 which is opposed to the porous body 10 with a space 15 intervening therebetween and is provided on its side facing the porous body 10 with a light diffusive reflection surface 32 and on the other side opposite to the one side with a light transmission surface 31, and an electric field forming means 40 which forms an electric field acting on the electroendosmosis liquid 20 and controls whether the electroendosmosis liquid 20 is brought into contact with the light diffusive reflection surface 32 by changing the electric field to selectively move the electroendosmosis liquid 20 toward the porous body 10 or the space 15.

The porous body 10 is formed of micro porous nitrocellulose and 2 μm in mean pore diameter in the surface 11 on the display surface side.

The electroendosmosis liquid 20 is formed of 3-methacryloxypropyl triethoxy silane (e.g. Shin-Etsu Chemical Co. Ltd. KBE-503) mixed with black dye and is colored in black.

The transparent plate 30 is a ground glass which has been applied with unevenness processing on one side thereof and is larger than 1.1 in refractive index of light. In the transparent plate 30, the side applied with the unevenness processing is used as the light diffusive reflection surface 32. The light diffusive reflection surface 32 is 10 μm in mean surface roughness Ra. The mean pore diameter of the porous body is 1 μm. The light diffusive reflection surface 32 is coated with water-repellant, oil-repellant film (e.g., CYTOP available from Asahi Glass Co. Ltd.) in a thickness of 10 nm.

The electric field forming means 40 comprises a transparent electrode 41 disposed on the display surface side surface 11 of the porous body 10, a transparent electrode 42 disposed on the bottom surface side surface 12 of the porous body 10 and a DC source 43 connected to the electrodes 41 and 42. Each of the transparent electrodes is transparent conductive film of $In_2O_3$—$SnO_2$ (ITO) formed by sputtering, and patterned to be arranged in matrix on the surface 11 or 12 of the porous body 10. The DC source 43 is connected to the transparent electrodes 41 and 42 so that an electric voltage is selectively applied to each of combinations of the transparent electrodes 41 and 42 (e.g., combinations 41*a* and 42*a*, 41*b* and 42*b*, ... ). The electric field forming means 40 forms a DC electric field in the display direction (the direction of arrow Z in FIGS. 1 and 2) by applying a DC voltage between the electrodes and moves the electroendosmosis liquid 20 toward the porous body 10 or the space 15 by changing the orientation (or the intensity) of the DC electric field.

A spacer 50 is provided between the transparent electrode 41 disposed on the display surface side surface 11 of the porous body 10 and the transparent plate 30 to hold the distance between the transparent plate 30 and the porous body 10 to about 20 μm.

Further, the electroendosmosis liquid 20 is impregnated in the porous body 10 in a suitable amount so that the electroendosmosis liquid 20 can be smoothly moved in the porous body 10 and the space 15.

The space 15 between the porous body 10 and the transparent plate 30 is filled with air at a pressure which does not limit the movement of the electroendosmosis liquid 20.

Operation of the display device 101 of this embodiment will be described, hereinbelow.

When the electric field forming means 40 forms no DC electric field or a DC electric field directed toward the bottom surface side (shown by arrow C2 in FIGS. 1 and 2) of the display device 101 from the display surface side (shown by arrow C1), the electroendosmosis liquid 20 stays in the porous body 10 under capillarity of the porous body 10 or is concentrated on the bottom surface side thereof under action of the electric field. Whereas, when the electric field forming means 40 forms a DC electric field directed from the bottom surface side of the display device 101 toward the display surface side, the electroendosmosis liquid 20 is concentrated in the space 15 under action of the electric field.

For example, a negative voltage (e.g., −100V) is applied to the bottom surface side transparent electrode 42a with respect to the display surface side transparent electrode 41a so that a DC electric field directed toward the bottom surface side of the display device 101 from the display surface side is produced between the transparent electrodes 41a and 42a and the electroendosmosis liquid 20 in the area between the transparent electrodes 41a and 42a is concentrated on the bottom surface side of the porous body 10, and a positive voltage (e.g., +100V) is applied to the display surface side transparent electrode 41b with respect to the bottom surface side transparent electrode 42b so that a DC electric field directed toward the display surface side of the display device 101 from the bottom surface side is produced between the transparent electrodes 41b and 42b and the electroendosmosis liquid 20 in the area between the transparent electrodes 41b and 42b is concentrated in the space 15.

In this case, the electroendosmosis liquid 20 is not in contact with the light diffusive reflection surface 32 in the area corresponding to the transparent electrodes 41a and 42a and air invades the uneven surface of the light diffusive reflection surface 32, whereby the light diffusive reflection surface 32 exhibits diffuse reflection due to mismatch of the refractive index of the transparent plate 30 and that of air, and reflects in diffuse reflection light projected from the display side. At this time, light reflected in diffuse reflection (e.g., white scattering light) is viewed from the display side (so-called white display).

Further in this case, the electroendosmosis liquid 20 is in contact with the light diffusive reflection surface 32 in the area corresponding to the transparent electrodes 41b and 42b and the electroendosmosis liquid 20 invades the uneven surface of the light diffusive reflection surface 32, whereby the light diffusive reflection surface 32 exhibits light transmittivity due to match of the refractive index of the transparent plate 30 and that of the electroendosmosis liquid 20, and transmits light projected from the display side. At this time, particular frequency components of the light transmitted by the light diffusive reflection surface 32 are absorbed by the electroendosmosis liquid 20 when it is colored and the color of the electroendosmosis liquid 20 (black, here) is viewed from the display side (so-called black display).

In the display device 101 of this embodiment described above, since the liquid 20 impregnated in the porous body 10 is moved by action of the electric field and the display is effected by changing the reflectance of the light diffusive reflection surface 32 by selectively bringing the liquid in contact with the light diffusive reflection surface 32, the reflectance can be changed greater as compared with in the conventional porous body surface and the image can be displayed at higher contrast.

Further, since the light diffusive reflection surface 32 of the transparent plate 30 is water-repellency-processed or oil-repellency-processed, the electroendosmosis liquid 20 is prevented from adhering to the light diffusive reflection surface 32 upon white display where the electroendosmosis liquid 20 is not to be in contact with the light diffusive reflection surface 32, thereby suppressing the wrong display.

Further, since the electroendosmosis liquid 20 is colored, the contrast between so-called white display and so-called non-white display is increased, and the difference therebetween can be more distinctly viewed.

Further it is possible to make transparent the electroendosmosis liquid and make colored the porous body so that the color of the porous body is viewed through the transparent electroendosmosis liquid when the electroendosmosis liquid is in contact with the light diffusive reflection surface.

Further it is possible to make one combination of the transparent electrodes carry the information on one pixel or make a plurality of combinations of the transparent electrodes (e.g., combinations of four neighbor electrodes) carry the information on one pixel.

What is claimed is:

1. A display device comprising:
   a porous body impregnated with electroendosmosis liquid,
   a transparent plate which is opposed to the porous body with a space intervening therebetween and is provided on its side facing the porous body with a light diffusive reflection surface and on the other side opposite to the one side with a light transmission surface, and
   an electric field forming means which forms an electric field acting on the electroendosmosis liquid and controls whether the electroendosmosis liquid is brought into contact with the light diffusive reflection surface by changing the electric field to selectively move the electroendosmosis liquid toward the porous body or the space; and
   wherein the light diffuse reflection surface is a surface which is rough and has a mean surface roughness, and the light diffuse reflection surface is rough to the extent that light is diffused when the electroendosmosis liquid remains inside the porous body and light is transmitted therethrough when the space is filled with the electroendosmosis liquid.

2. A display device as defined in claim 1 in which the light diffusive reflection surface of the transparent plate is water-repellency-processed or oil-repellency-processed.

3. A display device as defined in claim 2 in which the electroendosmosis liquid is colored.

4. A display device as defined in claim 1 in which the electroendosmosis liquid is colored.

5. A display device as defined in claim 1, wherein when the space is filled with the electroendosmosis liquid, the electroendosmosis liquid is in contact with the light diffusive refection surface.

6. A display device as defined in claim 1, wherein the mean surface roughness is not smaller than 0.1 μm and not larger than 500 μm.

7. A display device as defined in claim 1, wherein the mean surface roughness is not smaller than 0.1 μm and not larger than 100 μm.

8. A display device as defined in claim 1, wherein the mean surface roughness is not smaller than 0.1 μm and not larger than 50 μm.

9. A display device as defined in claim 1, wherein the transparent plate had a refractive index larger than 1.1.

10. A display device as defined in claim 1, wherein the transparent plate is a ground glass which had been applied with unevenness processing on one side thereof.

11. A display device as defined in claim 1, wherein the porous body has a bottom surface, wherein when the electroendosmosis liquid is concentrated on the bottom surface, the light diffusive refection surface exhibits diffuse reflection and reflects in diffuse reflection light projected from a display side of the display device, and when the electroendosmosis liquid is concentrated in the space, the light diffusive reflection surface exhibits light transmittivity and transmits light projected from the display side.

12. A display device as defined in claim 10, wherein frequency components of the transmitted light is absorbed by the electroendosmosis liquid.

13. A display device as defined in claim 10, wherein when the electroendosmosis liquid is concentrated in the space, the electroendosmosis liquid is in contact with the light diffusive refection surface.

14. A display device as defined in claim 1, wherein the electric field forming means includes:

a first electrode disposed on a bottom surface side surface of the porous body; and a second electrode provided on a side opposite of the bottom surface side surface of the porous body, wherein the first electrode and the second electrode consist of transparent material.

15. A display device as defined in claim 12, wherein the second electrode is disposed on a display surface side surface of the porous body.

16. A display device as defined in claim 12, wherein the second electrode is disposed on the light transmission surface of the transparent plate.

17. A display device as defined in claim 12, wherein the transparent plate is provided as the second electrode.

18. A display device as defined in claim 1, wherein the light diffusive reflection surface exhibits diffuse reflection due to a mismatch of a refractive index of the transparent plate and that of air within the space.

19. A display device as defined in claim 1, wherein the light diffusive reflection surface is a light scattering reflective surface.

20. A display device as defined in claim 1, wherein display is performed by varying the reflectance of the light diffusive reflection surface based on whether the electroendosmosis liquid contacts the light diffusive reflection surface of the transparent plate.

21. A display device as defined in claim 20, wherein the light diffusive reflection surface is a light scattering reflective surface.

* * * * *